March 29, 1932.  E. W. MIKAELSON  1,851,367
THREADING MACHINE
Original Filed Dec. 18, 1928   3 Sheets-Sheet 1
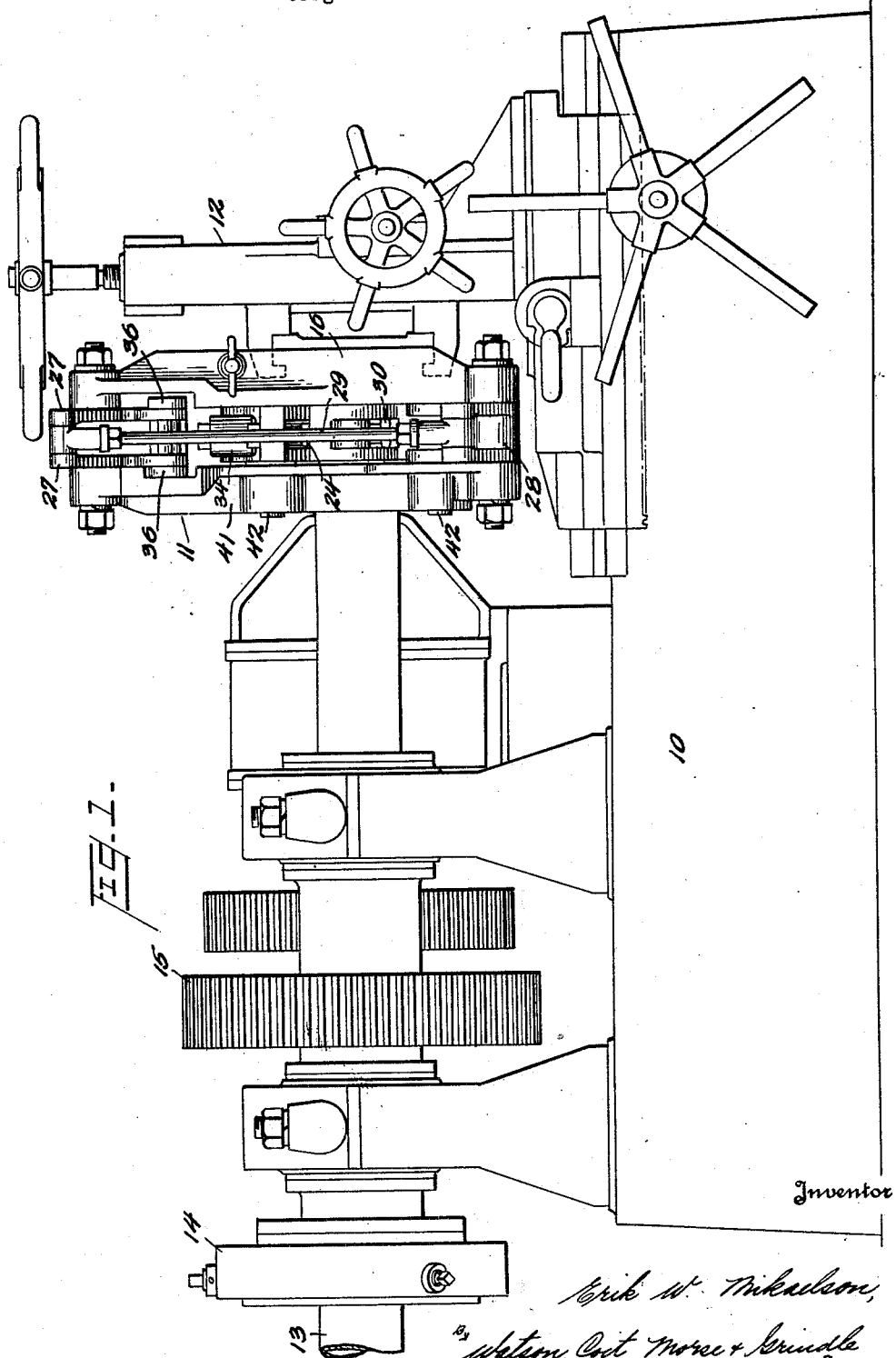
Inventor
Erik W. Mikaelson,
By Watson, Cost, Morse & Grindle
Attorneys

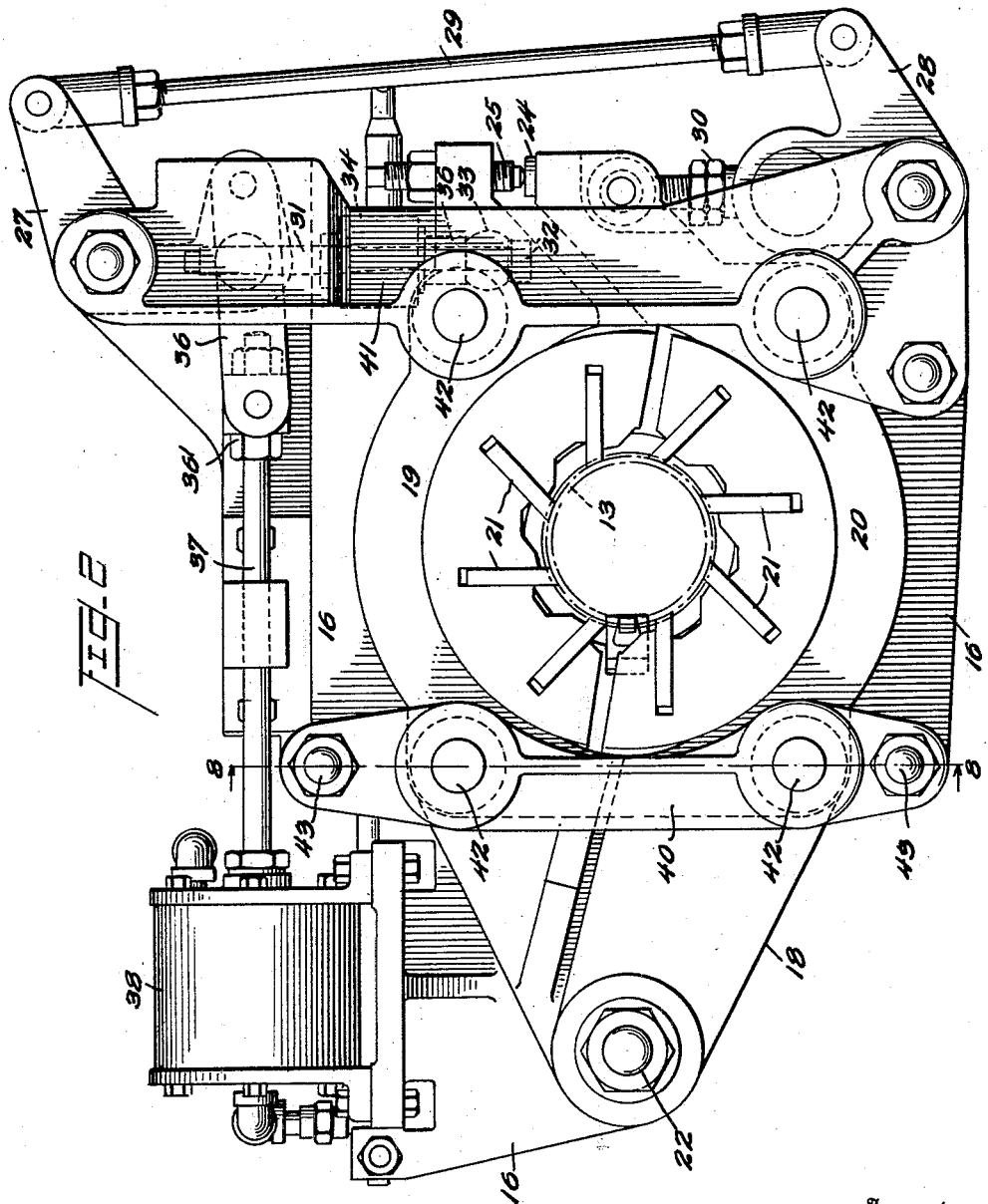

March 29, 1932. E. W. MIKAELSON 1,851,367
THREADING MACHINE
Original Filed Dec. 18, 1928 3 Sheets-Sheet 3
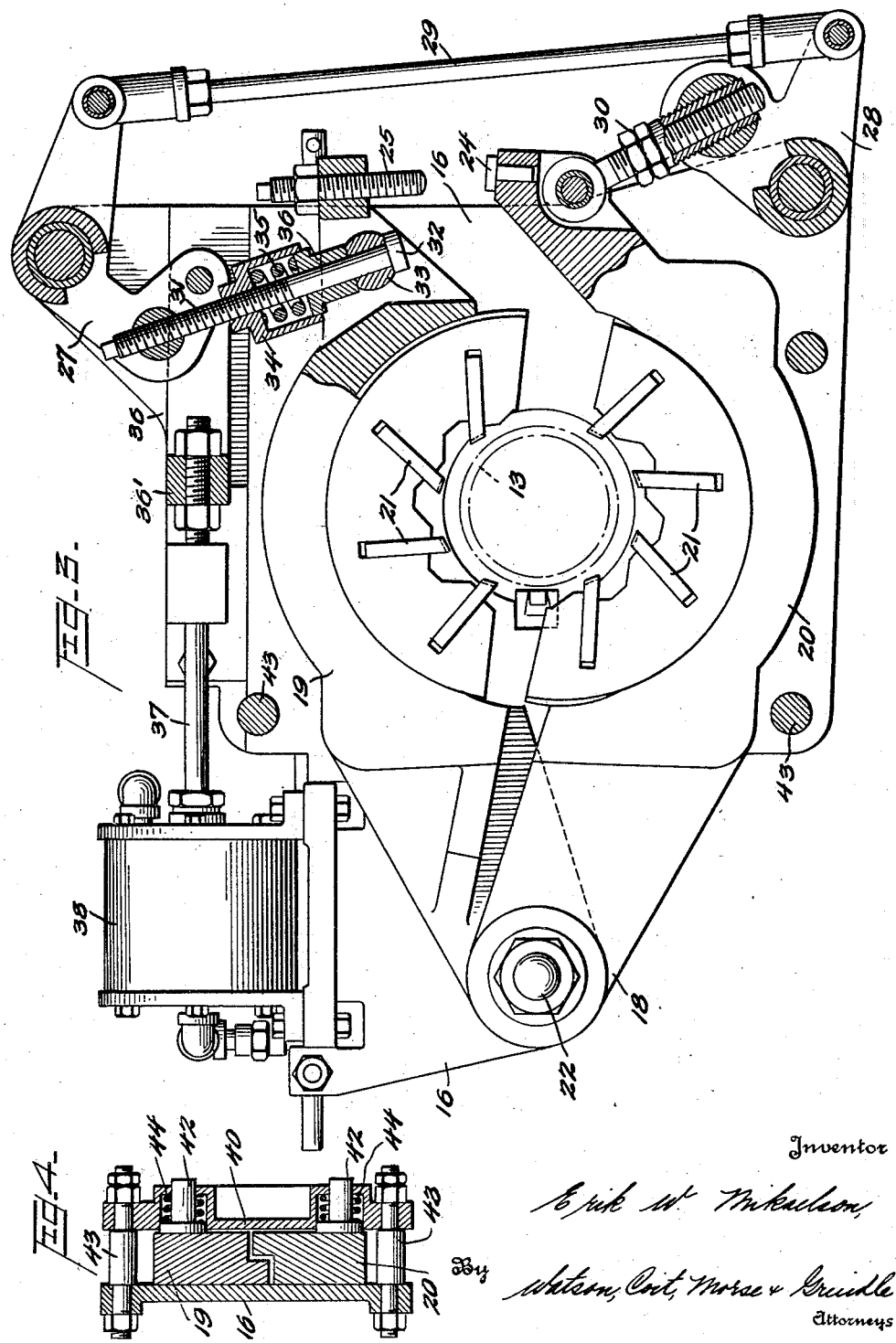

Patented Mar. 29, 1932

1,851,367

UNITED STATES PATENT OFFICE

ERIK W. MIKAELSON, OF EASTON, PENNSYLVANIA, ASSIGNOR TO TREADWELL ENGINEERING COMPANY, OF EASTON, PENNSYLVANIA, A CORPORATION OF PENNSYLVANIA

THREADING MACHINE

Original application filed December 18, 1928, Serial No. 326,866. Divided and this application filed October 28, 1930. Serial No. 491,752.

This invention relates to threading machines, and has for its object the provision of novel means for shifting the thread cutting elements into and out of engagement with the stock on which the thread is cut. Although the means disclosed herein for accomplishing this function is of general application and may be used with any type of threading machine, it is shown as applied to a combined cutting and threading machine of the type described and claimed in my copending application, Ser. No. 326,866, filed December 18, 1928, of which this application is a division.

It is a feature of the present invention to provide means whereby the extent of movement of the cutting elements into thread cutting position may be accurately determined and readily adjusted, and whereby the cutting elements may be firmly retained in the proper cutting relation with the stock regardless of objectionable clearance in the relatively moving parts due to temperature changes and wear.

A further object of the invention is the provision of means for taking up wear in the moving parts which support the thread cutting elements, and for ensuring accurate alignment of such parts to avoid incorrect cutting and mutilation of the threads.

Other objects and features of the present invention will be apparent from the following description taken in connection with the accompanying drawings, in which;

Figure 1 is an elevation of a threading machine embodying my invention;

Figure 2 is an end view of the mechanism for supporting and shifting the thread cutting elements into and out of engagement with the stock, the elements being shown in stock engaging or operative position;

Figure 3 is a view similar to Figure 2 showing the thread cutting elements in disengaged or inoperative position, a portion of the view being in cross section; and Figure 4 is a section on the line 8—8 of Figure 2.

In the embodiment disclosed herein, I have shown my invention as applied to a threading machine of that type in which the work is rotated and the thread cutting member is held stationary. It is to be understood, however, that my invention is equally applicable to other types of machines. Figure 1 of the drawings discloses a base 10 on which the threading machine, indicated generally at 11, and the facing or cutting off mechanism, indicated at 12, are mounted. The stock or pipe 13 is inserted from the left-hand end of the threading machine and is gripped by a rotating chuck 14. This chuck may be rotated in any convenient manner, but is preferably driven by gearing 15 supported on the base 10. The threading mechanism proper is shown in Figure 2 of the drawings and comprises a supporting member 16 and a sectional threading member 18, the last mentioned member comprising two sections 19 and 20. These sections are pivotally mounted at 22 on the support 16 and serve to support the thread cutting elements 21, which are commonly known as chasing tools. It will thus be seen that the sections 19 and 20 may be separated to disengage the chasing tools from the stock, the disengaged or inoperative position of the parts being shown in Figure 3 of the drawings. An abutment 24 is provided on the section 20 and a cooperating abutment 25 is screw threaded into a portion of the section 19 for limiting the movement of the sections to work engaging position. The abutment 25 may be adjusted to accurately determine the proper position of the parts during the threading operation.

The power actuated mechanism for controlling the pivotal movement of the sections 19 and 20 may be constructed in various ways, but preferably comprises a pair of bell crank levers 27 and 28 which may be mounted on any convenient portion of the supporting member 16 and which are connected by a link 29. The opposite arms of these bell crank levers are adjustably connected with respective sections of the threading member, one of these adjustable connections being shown at 30. The connection between the remaining bell crank lever and the corresponding section comprises a rod 31 which is threaded into the bell crank lever at one end and is provided with a headed portion 32 at its opposite end for cooperation with a member 33 formed on the section 19. An element 34 threaded on rod 31 serves as an adjustable abutment for a spring 35. At its opposite end this spring engages a sleeve 36 which is in turn in contact with the member 33.

In Figure 3 these parts are shown in the positions which they occupy when the thread cutting elements are disengaged from the stock and it will be observed that the spring 35 maintains the member 33 in engagement with the headed portion 32 of the rod 31. The spring 35 is sufficiently stiff to resist any movement of the thread cutting elements during the cutting operation and serves to retain these cutting elements firmly in engagement with the stock. It will nevertheless be observed by reference to Figure 2, in which the cutting elements are illustrated in the position which they occupy during the cutting operation, that the spring 35 is permitted to yield slightly when the sections 19 and 20 of the threading member 18 occupy their closed position. For instance, the abutment 25 is preferably so adjusted as to seat firmly against the abutment 24 in the closed position of the threading member, these two abutments engaging slightly before the bell crank levers 27 and 28 have completed their movement to engage the cutting elements with the stock. This movement results in a slight compression of the spring 35 so that as shown in Figure 2, there is a slight clearance between the member 33 and the headed portion 32 on the rod 31.

It is essential that some yieldable element be provided in the train of actuating mechanism for the sections of the threading member since ordinary wear between the various moving parts and even slight changes in the length of these parts due to variations in temperature would otherwise render it impossible to properly engage the cooperating abutments 24 and 25. These difficulties are overcome in the present instance by the slight yielding of the spring 35 after the abutments engage, but it will be understood that this spring is preferably of such strength as to prevent further compression thereof during the actual cutting operation.

In the embodiment of the invention illustrated in the drawings the bell crank levers 27 and 28 are simultaneously actuated by means of a link 36 pivoted to one arm of the lever 27. This link is preferably provided with an adjustable connection indicated at 36' with a piston rod 37 which is in turn reciprocated by a fluid operated device 38 mounted on the supporting member 16.

Operation of the device 38 thus serves to rock the bell crank levers 27 and 28 to effect simultaneous movement of the sections 19 and 20 of the threading member about their point of pivotal support 22.

While this arrangement ensures effective and prompt manipulation of the sections of the threading member to operative and inoperative positions, it will be understood that power mechanism such as illustrated in the drawings need not be used to operate the bell crank levers 27 and 28 since these levers may be operated manually if desired by providing any conventional form of hand control therefor. In either event the threading member 18 may be rapidly moved to operative and inoperative positions by means of the linkage which provides in effect a toggle action as distinguished from arrangements in which threaded mechanism requiring considerable manipulation for the closing and opening of the threading member is employed. This saving of time in the operation of the threading member is small when only one such operation is considered but in the modern high speed threading machine it becomes tremendously important during the operation of the machine over long periods of time.

Since it is important to maintain the sections 19 and 20 in accurate alignment, and since these sections are subject to frequent movement during the operation of the machine, it has been found necessary to provide means for assuring the retention of the sections in their proper plane of movement. The invention therefore contemplates the provision of means for maintaining the side faces of the sections 19 and 20 in engagement with the member 16 over a substantial portion of the surface thereof regardless of the position of the sections. One such means is illustrated in the drawings, and comprises plates 40 and 41 located on each side of the zone of operation of the chasing tools. Figure 4 shows a cross-section taken through the plate 40, from which it will be seen that this plate is mounted on the member 16 by means of shouldered bolts 43 for spacing the plate 40 a sufficient distance from the member 16 to accommodate the sections 19 and 20 therebetween. It is obvious that the spacing between these parts might be so designed as to maintain the sections 19 and 20 in close working engagement with both the plate 40 and the supporting member 16. Under these conditions, however, the wear between the parts due to the frequent opening and closing of the sections soon results in an undesirable amount of clearance so that the sections of the threading member are not held in close alignment, causing improper cutting or mutilation of the threads. This difficulty is overcome in the present invention by the provision of bearing members 42 which are slidably mounted in the plate 40 and are actuated by springs 44 into engagement with the side faces of the sections 19 and 20, thus retaining these sections in close engagement with the supporting member 16. Since the spring pressed bearing members are located at spaced points on each side of the chasing tools, the sections 19 and 20 are maintained in proper working relationship regardless of wear.

While I have described one embodiment of my invention for the purpose of illustrating the principles and mode of operation involved, it will be appreciated that various changes and alterations may be made in the details of construction specifically shown and described and that such further modifications are contemplated as fall within the spirit and scope of the appended claims.

Having thus described the invention, what is claimed as new and desired to be secured by Letters Patent is:

1. In threading apparatus, the combination with a support, of a pair of cooperating die sections pivotally mounted thereon for movement into and out of work engaging position, and means for moving said die sections comprising a pair of bell crank levers pivotally mounted on said support, means for actuating one of said levers, a link connection between one arm of each lever, and a connection between each of the other arms and one of said die sections.

2. In threading apparatus, the combination with a support, of a pair of cooperating die sections pivotally mounted thereon for movement into and out of work engaging position, and means for moving said die sections comprising a pair of bell crank levers pivotally mounted on said support, means for actuating one of said levers, a link connection between one arm of each lever, and a connection between each of the other arms and one of said die sections, one of said last mentioned connections being resilient.

3. In threading apparatus, the combination with a support, of a pair of cooperating die sections pivotally mounted thereon for movement into and out of work engaging position, relatively adjustable cooperating abutments on said die sections for limiting the movement thereof to work engaging position, and means for moving said die sections comprising a pair of bell crank levers pivotally mounted on said support, means for actuating one of said levers, a link connection between one arm of each lever, and a connection between each of the other arms and one of said die sections.

4. In threading apparatus, the combination with a support, of a pair of cooperating die sections pivotally mounted thereon for movement into and out of work engaging position, and resilient means engaging each die section to retain the latter in engagement with said support for preventing disalignment of said sections.

5. In threading apparatus, the combination with a support, of a pair of cooperating die sections pivotally mounted thereon, each section having a side face bearing against said support, and resilient means engaging the opposite side face of each section for maintaining said sections in engagement with said support.

6. In threading apparatus, the combination with a support, of a pair of cooperating die sections pivotally mounted thereon, each section having a side face bearing against said support, and resilient means carried by said support and engaging the opposite side face of each section or maintaining said sections in engagement with said support.

7. In threading apparatus, the combination with a support, of a pair of cooperating die sections pivotally mounted thereon, each section having a side face bearing against said support, a plate mounted on said support and located adjacent the opposite side faces of the sections, and yielding means mounted on said plate and engaging said sections to hold them in engagement with said support.

8. In threading apparatus, the combination with a support, of a pair of cooperating die sections pivotally mounted thereon, each section having a side face bearing against said support, a plate mounted on said support and located adjacent the opposite side faces of the sections, a member for engagement with each die section mounted in said plate, and a spring for urging each member outwardly from said plate to maintain the sections in engagement with said support.

9. In threading apparatus, the combination with a support, of a pair of cooperating die sections pivotally mounted thereon, each section having a work engaging portion intermediate the ends thereof, and resilient means mounted on each side of said intermediate portions for maintaining said sections in engagement with said support to prevent disalignment of the sections.

10. In threading apparatus, the combination with a support, of a pair of cooperating die sections pivotally mounted thereon for movement into and out of work engaging position, means carried by said sections and arranged to engage to limit the movement of said die sections into work engaging position, and mechanism operable to move said die sections toward and from each other, said mechanism including an element adapted to yield in response to continued operation of said mechanism after said means have engaged.

11. In threading apparatus, the combination with a support, of a pair of cooperating die sections pivotally mounted thereon for movement into and out of work engaging position, cooperating abutments associated with said die sections arranged to engage to limit the movement of the sections to work engaging position, one of said abutments being adjustable to vary the relative position of said sections, and mechanism operable to move said die sections toward and from each other, said mechanism including an element adapted to yield in response to continued operation of said mechanism after said abutments have engaged.

12. In threading apparatus, the combination with a support, of a pair of cooperating die sections pivotally mounted thereon for movement into and out of work engaging position, means carried by said sections and arranged to engage to limit the movement of said die sections into work engaging position, and mechanism operable to move said die sections toward and from each other, said mechanism including a spring adapted to yield in response to continued operation of said mechanism after said means have engaged, said spring offering sufficient resistance to deflection to firmly retain said means in engagement during the threading operation.

In testimony whereof I hereunto affix my signature.

ERIK W. MIKAELSON.